(12) United States Patent
Bavishi, III

(10) Patent No.: US 8,439,072 B2
(45) Date of Patent: May 14, 2013

(54) HYDROCARBON GAS DELIVERY SYSTEM

(75) Inventor: Pankaj A. Bavishi, III, Pune (IN)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 12/910,045

(22) Filed: Oct. 22, 2010

(65) Prior Publication Data

US 2012/0098666 A1 Apr. 26, 2012

(51) Int. Cl.
*F16K 31/48* (2006.01)
*F16K 51/00* (2006.01)
*F17D 3/00* (2006.01)

(52) U.S. Cl.
USPC ............... 137/624.11; 137/237; 137/246

(58) Field of Classification Search ............... 137/15.08, 137/15.11, 237, 238, 239, 240, 241, 246, 137/246.11, 624.11
See application file for complete search history.

(56) References Cited

U.S. PATENT DOCUMENTS

| | | | | |
|---|---|---|---|---|
| 4,545,506 A | * | 10/1985 | Kadono | 222/95 |
| 4,768,561 A | * | 9/1988 | Hyodo et al. | 138/97 |
| 4,916,437 A | * | 4/1990 | Gazzaz | 340/632 |
| 5,269,171 A | * | 12/1993 | Boyer | 73/40.5 R |
| 5,582,201 A | | 12/1996 | Lee et al. | |
| 5,586,580 A | * | 12/1996 | Fisk et al. | 138/98 |
| 6,196,056 B1 | * | 3/2001 | Ewing et al. | 73/40.7 |
| 6,467,466 B1 | | 10/2002 | Maekawa et al. | |
| 6,691,724 B2 | * | 2/2004 | Ford | 137/1 |
| 2006/0243347 A1 | * | 11/2006 | Humphrey | 141/95 |
| 2009/0305098 A1 | | 12/2009 | Ohara et al. | |

FOREIGN PATENT DOCUMENTS

| | | |
|---|---|---|
| GB | 1485461 | 9/1977 |
| JP | 57082621 A | 5/1982 |
| JP | 10122055 A | 5/1998 |
| WO | WO2005111962 A1 | 11/2005 |
| WO | WO2008147043 A1 | 12/2008 |
| WO | WO2010019025 A2 | 2/2010 |

OTHER PUBLICATIONS

ITS Digital Library, Pratomo, Fariz, "Detection LP Gas Use Microcontroller AVR With SMS as Media Information", Sep. 15, 2010, http://digilib.its.ac.id/ITS-NonDegree_3100009036102/841, pp. 1-3.
eSuppliersIndia.com, "Somya Pyrotek Services, LPG/CNG Gas Leak Detectors", Sep. 15, 2010, http://www.esuppliersindia.com/somya-pyrotek-services-/lpg-cng-gas-leak-detectors-pr2361605-sTL-swf.html, pp. 1-3.

(Continued)

*Primary Examiner* — Kevin Lee
*Assistant Examiner* — Kevin Barss
(74) *Attorney, Agent, or Firm* — Cynthia G. Seal; Jeffrey L. Streets

(57) ABSTRACT

Embodiments of the invention include a system and method for controllably delivering hydrocarbon gas to a hydrocarbon gas-fueled device. According to one embodiment, a valve having an open state and a closed state is used to control the flow of hydrocarbon gas from a pressure vessel to a supply line. A hydrocarbon gas sensor detects airborne hydrocarbon gas and generates a signal in response. A controller automatically moves the valve to the closed state in response to the signal from the hydrocarbon gas sensor while the valve is in the open state. The controller automatically releases liquid sealant to the supply line in response to a continued signal from the hydrocarbon gas sensor after at least attempting to move the valve to the closed state.

13 Claims, 3 Drawing Sheets

OTHER PUBLICATIONS

"Lpg/Lng Gas Detector", Sep. 15, 2010, http://www.chinaqualitylighting.com/d-p117314977837961225-Lpg_%252f_Lng_Gas_De . . . , pp. 1-2.

"LPG Detector System-Complete", http://www.westmarine.com/1/1/8577-lpg-detector-system-complete.html, Sep. 15, 2010, pp. 1-2.

Liu "Rapid Detection of Hazardous Gas Using One SnO2 Gas Sensor Based on Dynamic Measurement", Proceedings of 2004 International Conference on Information Acquisition, pp. 113-115.

Dhawale et al., "Room Temperature Liquefied petroleum Gas (LPG) Sensor, 'Sensors and Actuators B: Chemical'" Sensors and Actuators B 147 (2010), Infotrieve, Elsevier pp. 488-494.

Takashi "A Simple Type of Fire and Gas Leak Prevention System Using Tin Oxide Gas Sensors", Infotrieve, Elsevier, 1991, pp. 227-229.

Trident Rubber, "12V LPG Gas Detection and Control System", Trident Rubber LPG at West Marine, www.westmarine.com/webapp/wcs/stores/servlet/ProductDisplay?catalogID=10001 . . . , Sep. 27, 2010, 2 pages.

Seal-Tite International, "The Downhole Leak Repari Specialists—Frequently Asked Questions", Wellhead, Umbilical, Safety Valve, Subsea & Flowline Leaks—SealTite FAQ, www.seal-tite.com/html/faqs.html, Sep. 28, 2010, pp. 1-2.

SPI Supplies, "Vacseal Hight Vacuum Leak Sealant—UHV Compatible 'Unique silicone based system for sealing leaks in high and ultra high vacuum systems'", www.2spi.com/catalog/vac/vacleak.shtml, Sep. 28, 2010, pp. 1-4.

PCT/EP2011/067287, "PCT International Search Report and Written Opinion", Date of mailing: Dec. 21, 2011, IBM United Kingdom Limited, Hursley Park, Winchester, Hampshire SO21 2JN, ROYAUME UNI, Applicant: International Business Machines Corporation, International application No. PCT/EP2011/067287 filing date: Oct. 4, 2011, 12 pages.

\* cited by examiner

HYDROCARBON GAS DELIVERY SYSTEM

BACKGROUND

1. Field of the Invention

The present invention relates to controlling the flow of liquefied petroleum gas to a hydrocarbon gas-fueled device, and more particularly to detecting airborne hydrocarbon gas and automatically controlling the flow of hydrocarbon gas in response thereto.

2. Background of the Related Art

Combustible hydrocarbon gas is often used as a fuel source to power devices (i.e. hydrocarbon gas-fueled devices). Liquefied petroleum gas ("LPG") refers to a category of hydrocarbon materials that are used as fuels in a gaseous form at atmospheric pressure but are stored in a pressurized, liquefied state within a pressure vessel. LPG is controllably released to atmosphere on-site to enter the gaseous state immediately prior to being consumed as a fuel in a hydrocarbon gas-fueled device. The term "LPG" may be used to refer to such a material both in its pressurized, liquefied state and its gaseous state. LPG commonly includes propane, butane, and mixtures thereof. Familiar applications for LPG include, for example, propane-burning grills, automobiles, and some domestic central heating systems.

LPG is a relatively clean-burning fuel that produces low emissions compared with the burning of other fossil fuels, such as coal. Therefore, the storage and use of LPG is generally regarded as causing minimal pollution. Hydrocarbon gas-fueled devices and vessels for storing LPG are also generally well designed and include safety mechanisms that allow for safe storage and use of LPG. However, the combustible nature of LPG can still be hazardous when not properly handled or stored. For example, a leak of LPG from a system can pose the risk of fire or explosion.

BRIEF SUMMARY

One embodiment of the present invention provides a system for controllably delivering hydrocarbon gas to a hydrocarbon gas-fueled device. The system includes a pressure vessel for containing a pressurized hydrocarbon gas. A valve is selectively movable between an open state and a closed state for controlling the flow of the hydrocarbon gas from the pressure vessel to a supply line in fluid communication with the pressure vessel. A liquid sealant is provided in a sealant container. The liquid sealant is configured for hardening if released from the sealant container. A hydrocarbon gas sensor is configured for detecting airborne hydrocarbon gas and generating a signal in response to detecting the airborne hydrocarbon gas. A controller is in communication with the hydrocarbon gas sensor and the valve. The controller includes a prime mover configured for automatically moving the valve to the closed state in response to the signal from the hydrocarbon gas sensor if the valve is in the open state. The controller is configured for releasing the liquid sealant to the supply line in response to the signal from the hydrocarbon gas sensor if the valve is in the closed state.

For example, if the signal is from the sensor is received while the valve is in the open state, an attempt is made to close the valve. If the signal from the sensor is received when the valve is in the closed state (either because the valve was already in the closed state or because the controller previously attempted to close the valve) then the liquid sealant is released to the supply line as a backup measure.

DETAILED DESCRIPTION

Embodiments of the present invention include a system and method for safely delivering a hydrocarbon gas to a hydrocarbon gas-fueled device. Embodiments of the invention further include a safety system and method for taking one or more corrective actions in response to detecting airborne hydrocarbon gas. In at least one embodiment, a valve for controlling the supply of hydrocarbon gas to a device may be automatically closed in response to detecting a threshold level of airborne hydrocarbon gas. If airborne hydrocarbon gas continues to be detected after at least attempting to close the valve, then a liquid sealant may be automatically released from a sealant container and delivered to a hydrocarbon gas supply line to stop the flow of gas through the supply line to the device in an effort to prevent or reduce escaping hydrocarbon gas. Embodiments of the invention are discussed below in the context of a hydrocarbon gas delivery system for supplying a hydrocarbon gas to a hydrocarbon gas-fueled device, such as a hydrocarbon gas-fueled grill or burner. However, a system used with other devices, such as propane-powered vehicles or domestic central heating systems, are also within the scope of the invention.

Figure 1:
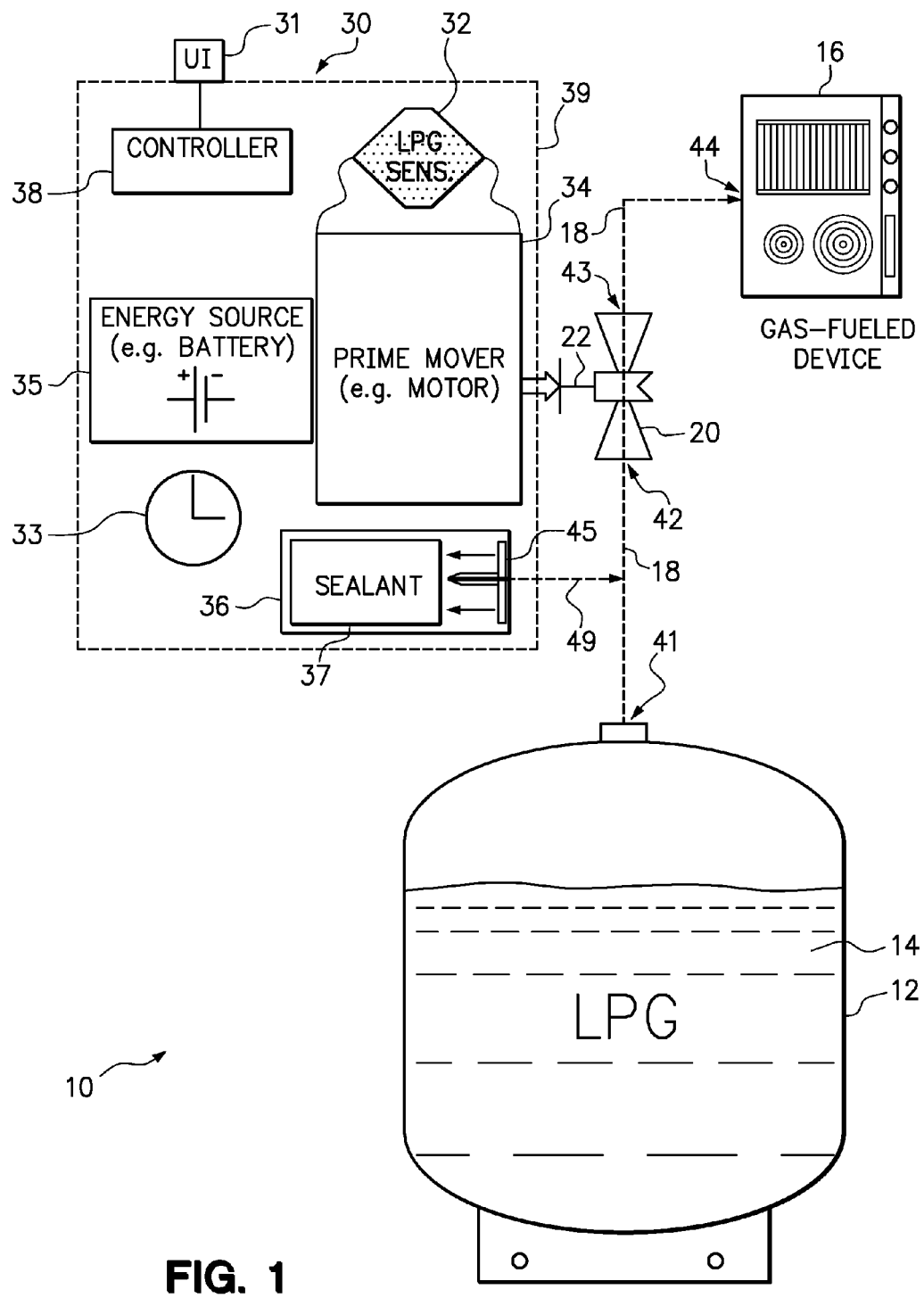
FIG. 1 is a schematic diagram of a hydrocarbon gas delivery system according to an embodiment of the invention.

FIG. 1 is a schematic diagram of a safety system 30 being used with a hydrocarbon gas delivery system 10 according to an embodiment of the invention. The hydrocarbon gas delivery system 10 includes a tank 12, a supply line 18, and a valve 20 to controllably deliver hydrocarbon gas 14 from the tank 12 to a hydrocarbon gas-fueled device 16. The tank 12 is a pressure vessel for containing a pressurized hydrocarbon gas, such as liquefied petroleum gas (LPG), for use as a fuel. As used herein, the terms "hydrocarbon gas" and "liquefied petroleum gas" (LPG) refers to a hydrocarbon fuel whether it is in a pressurized, liquefied state while being stored, or in a depressurized, gaseous state just prior to being combusted in the hydrocarbon gas-fueled device 16). The hydrocarbon fuel in the tank 12 is likely to be present in equilibrium amounts of both liquid and gas. The gas in the top of the tank 12 is what is supplied through the supply line 18. The gas experiences a pressure drop across the supply valve 20 and may approach atmospheric pressure as the gas reaches the hydrocarbon gas-fueled device 16.

The hydrocarbon gas-fueled device 16 may be a cooking device, such as hydrocarbon gas-burning grill or stove. In the example of a hydrocarbon gas-burning grill or stove, the tank 12 may be a refillable metal "LPG tank" for containing a liquefied hydrocarbon gas. The supply line 18 is in fluid communication with the tank 12 and the hydrocarbon gas-fueled device 16, and provides a flow path for bringing the hydrocarbon gas 14 from the tank 12 to the hydrocarbon gas-fueled device 16. The hydrocarbon gas 14 is consumed at the hydrocarbon gas-fueled device by combustion.

The valve 20 is provided along the supply line 18 for controlling the flow of hydrocarbon gas 14 from the tank 12 to the hydrocarbon gas-fueled device 16. The valve 20 may be any of a variety of valve types generally known in the art apart from the particular uses described herein. The hydrocarbon gas delivery system may include flow control elements such as piping or tubing used for supply line 18, along with pressure fittings that couple the supply line 18 to the tank 12 at location 41, to the valve 20 at locations 42 and 43, and to the hydrocarbon gas-fueled device 16 at location 44. The valve 20, supply line 18, and other flow control elements of the hydrocarbon gas delivery system 10 provide a generally sealed flow path from the tank 12 to the hydrocarbon gas-fueled device 16 through which the hydrocarbon gas 14 may flow.

The valve 20 may be any of a variety of valve types known in the art suitable for controlling the flow of hydrocarbon gas. The valve 20 includes a mechanical valve actuator 22 for moving the valve between an open state and a closed state. For example, the mechanical actuator 22 may include a rotatable element that is rotated in one direction to open the valve and rotated in an opposite direction to close the valve 20. In the open state, hydrocarbon gas 14 is allowed to flow through valve 20, from the tank 12 to the hydrocarbon gas-fueled device 16. In the closed state, hydrocarbon gas 14 from the tank 12 is prevented by the valve 20 from flowing from the tank 12 to the hydrocarbon gas-fueled device 16. The hydrocarbon gas-fueled device 16 may also include its own valves, orifices or the like to further control the flow of the gas.

The schematically-drawn safety system 30 is configured for use with the hydrocarbon gas delivery system 10. The safety system 30 includes an LPG sensor 32 for sensing airborne hydrocarbon gas, a prime mover 34 for moving the valve 20 between the open and closed states, an energy source 35 for powering the prime mover 34, a liquid sealant 37 in an air-tight liquid sealant container 36, and controller 38. The controller 38 may store instructions or control logic on a computer-usable storage medium such as an application-specific integrated circuit (ASIC) or other electronic circuit or chip. Those skilled in the art will appreciate that the various electrical components of the safety system 30 may include electrical power and/or signal connections, using electrical communication pathways including but not limited to wires, circuit board traces, and wiring harnesses. The safety system 30 is configured to interface with the hydrocarbon gas delivery system 10, to monitor any airborne hydrocarbon gas external to the hydrocarbon gas delivery system 10 and to take action in response to detecting hydrocarbon gas from the hydrocarbon gas delivery system 10. For example, the sensor 32 may generate a signal in response to detecting airborne hydrocarbon gas, which is indicative of a leak from the hydrocarbon gas delivery system 10. As further described below, the controller 38 includes functionality for selectively operating the prime mover 34 to open or close the valve 20 and/or release the sealant 37 from the sealant container 36 in response to a signal from the LPG sensor 32.

The prime mover 34, as that term is generally understood in the art, is a machine that uses thermal, electrical or potential energy to perform mechanical work. The prime mover 34 may also engage the tank 12 or supply line 18 to oppose torque applied to the valve 20. The prime mover 34 is removably coupled to the valve 20. For example, in the present embodiment, the prime mover is operably coupled to the mechanical valve actuator 22 to move the valve between the open and closed positions. It is desirable for the prime mover 34 to be able to move the valve 20 alternately and repeatedly between the open and closed states, such as for the convenience of being able to power the valve 20 between the open and closed positions, in lieu of operating the mechanical actuator 22 by hand. However, it is sufficient for the prime mover 34 to at least be able to close the valve 20 (assuming the valve 20 is properly functioning and closeable) in response to the detection of a gas leak. In the illustrated example, the prime mover 34 is a motor, such as an electric motor, and the energy source 35 may be an electric battery. The electric battery may also supply electrical energy to operate other components of the safety system 30, such as the LPG sensor 32. The motor can open or close the valve 20 by rotating the mechanical actuator 22. Other non-limiting examples of prime movers include solenoids for alternately opening and closing the valve 20, a pneumatically-operated member for alternately opening and closing the valve 20 in response to fluid pressure, or a spring-loaded member that may be triggered for closing the valve 20 using energy stored by the spring.

The safety system 30 may be in a modular form adapted for use with an otherwise conventional hydrocarbon gas delivery system. In one example of a modular form, the prime mover 34 and energy source 35, the LPG sensor 32, and the sealant container 36 and liquid sealant 37 are all contained within a rigid adapter body 39. The rigid adapter body 39 may be removably secured to the hydrocarbon gas delivery system 10, such as by being mounted on the tank 12, with the prime mover 34 being removably coupled to the mechanical actuator 22 of the valve 20. In an alternative embodiment, the valve 20 may also be included with the safety system and housed within the rigid adapter body 39, with the prime mover 34 permanently coupled to the mechanical actuator 22 of the valve 20. In a modular embodiment, the safety system 30 may be separately manufactured and sold as an after-market add-on device for use with conventional hydrocarbon gas delivery system or components.

During normal operation, hydrocarbon gas 14 may be supplied from the tank 12 to the hydrocarbon gas-fueled device 16. The valve 20 may be opened to supply the hydrocarbon gas 14 to the hydrocarbon gas-fueled device 16. The valve 20 may be opened manually, such as by a human user moving the mechanical actuator 22 by hand. Alternatively, opening and closing the valve 20 may be facilitated during normal operation, using the prime mover 34. For example, a user interface (UI) 31 may include one or more buttons, switches, or other controls operable by a user to control the prime mover 34 for opening and closing the valve 20 in response to the user input. In this respect, opening and closing the valve is facilitated using the prime mover 34 to open and close the valve 20 without the user physically touching the valve 20. When the valve 20 is open to supply hydrocarbon gas from the tank 12 to the hydrocarbon gas-fueled device 16, the user may operate the hydrocarbon gas-fueled device in a conventional manner. For example, the hydrocarbon gas-fueled device 16, itself, may include controls for regulating the flow of hydrocarbon gas to individual burners or other elements of the hydrocarbon gas-fueled device 16. The hydrocarbon gas-fueled device 16 may, for example, include a pilot flame fueled by the hydrocarbon gas or other ignition source (not shown).

If airborne hydrocarbon gas is detected in the vicinity of the hydrocarbon gas delivery system 10, it is an indication of a leak in the system. One of the more likely causes of airborne hydrocarbon gas in the vicinity of the hydrocarbon gas delivery system 10 is if a pilot flame (not shown) goes out while the valve 20 is open and hydrocarbon gas 14 is being delivered from the tank 12 to the hydrocarbon gas-fueled device 16. Although less likely, a leak can occur in the hydrocarbon gas delivery system 10 itself, such as due to accidents, misuse, or user-neglect. Potential leakage sites include, but are not limited to, an interface provided at location 41 between the supply line 18 and the tank 12, an interface provided at location 42 between the valve 20 and a portion of the supply line 18 upstream of the valve 20, at an interface at location 43 between the valve 20 and a portion of the supply line 18 downstream of the valve 20, or at an interface at location 44 between the supply line 18 and the hydrocarbon gas-fueled device 16. A damaged supply line 18 or damaged valve 20 may also allow hydrocarbon gas to leak from the hydrocarbon gas delivery system 10. The LPG sensor 32 is preferably maintained in a powered-on state at all times, since various potential causes of escaping hydrocarbon gas exist whether the valve 20 is open or closed and whether or not the hydrocarbon gas-fueled device 16 is currently being operated by a user. In a continuously powered-on state, the sensor 32 may continuously monitor for airborne hydrocarbon gas regardless of whether the valve 20 is open or closed and regardless of whether a user is currently using the hydrocarbon gas-fueled device 16.

The LPG sensor 32 monitors the air to detect airborne hydrocarbon gas. The safety system 30 may perform one or more corrective actions in response to detecting the airborne gas. As governed by the controller 38, a first example of a corrective action that may be taken by the safety system 30 in response to the sensor 32 detecting airborne hydrocarbon gas is for the prime mover 34 to automatically close the valve 20 (or at least attempt to close the valve 20). This corrective action may be performed by the prime mover 34 as instructed by the controller 38 in response to the signal from the LPG sensor 32. This corrective action is thereby performed automatically by the safety system 30, and does not require user intervention or user input. Successfully closing the valve 20 would be effective at stopping the flow of non-combusted hydrocarbon gas anywhere downstream of the valve 20. For example, a leak at the interface at location 43 between the downstream portion of the supply line 18 and the valve 20 or an unlighted pilot flame at the hydrocarbon gas-fueled device 16 are two examples of escaping hydrocarbon gas downstream of the valve 20 for which closing the valve 20 would be effective at preventing the further escape of non-combusted hydrocarbon gas 14 into the air.

In other cases, attempting to close the valve 20 may not be effective at preventing the escape of non-combusted hydrocarbon gas 14 into the air. For example, if hydrocarbon gas is escaping from the hydrocarbon gas delivery system 10 at a location upstream of the valve 20, such as at the interface 41 between the supply line 18 and the tank 12, closing the valve 20 will not stop the escaping hydrocarbon gas. In another scenario, the valve 20 may be failed or stuck, or a mechanical interface between the prime mover 34 and the valve 20 may be damaged to prevent the prime mover 34 from correctly operating the valve 20. In such cases, the prime mover 34 may be unable to close the valve 20. As a failsafe measure, therefore, a second example of a corrective action that may be taken by the safety system 30 as governed by the controller 38 is to release the liquid sealant 37 to the flow passage from the tank 12 to the hydrocarbon gas-fueled device 16. The liquid sealant may comprise a glue or epoxy that remains in a liquefied state indefinitely while in the sealant container 37, but which subsequently cures or otherwise hardens in a relatively short time period after being released from the sealant container. Non-limiting examples of liquid sealant include Seal-Tite® sealants available from Seal-Tite International and Vacseal® High Vacuum Leak Sealant available from Space Environment Laboratories. In the illustrated example, the liquid sealant 37 is released to the portion of the supply line 18 upstream of the valve 20 through a separate port in the supply line. Assuming the liquid sealant 37 successfully closes the flow passage within the supply line, this would stop or substantially reduce any further flow of hydrocarbon gas from the tank 12. For example, the sealant 37 may be pressurized at a pressure of greater than the gas pressure in the supply line 18 to generate positive flow from the released sealant 37 to the supply line. Other methods of delivering a liquid to the supply line 18 are also within the scope of the invention.

When attempting to stop or reduce escaping hydrocarbon gas, it is desirable to deliver the liquid sealant 37 to a location upstream of the valve 20. By delivering the liquid sealant to a location upstream of the valve 20, a leak anywhere downstream of the location where the liquid sealant is applied may be remedied. Delivering the liquid sealant upstream of the valve 20 may also allow the liquid sealant to be urged into the valve 20 by gas pressure in the flow passage. In a scenario in which the valve has become damaged or otherwise cannot be completely closed, the valve 20 may at least be partially closed and provide a gas-flow restriction to the supply line 18 upstream of the valve 20. Thus, it may be easier to seal off an internal gas flow passage within the valve 20, itself, than to seal off the portion of the supply line 18 upstream of the valve 20, using the liquid sealant 37. Additionally, or in the alternative, liquid sealant 37 may be applied to a location downstream of the valve 20.

The liquid sealant 37 may be stored in the sealant container 36 and subsequently released to a desired location of the hydrocarbon gas delivery system 10 in a variety of ways. In one, non-limiting example, the liquid sealant is stored under pressure within the sealant container 36. An aerosol or propellant may be included within the sealant container 36 along with the liquid sealant 37. A sealant flow path 49 may be provided from the sealant container 36 to the desired location of the hydrocarbon gas delivery system 10. When the liquid sealant 37 is to be released, the sealant container 36 may be opened at the location of the sealant flow path 49 to release the liquid sealant 37 to the sealant flow path 49. For example, the sealant container 36 may be punctured in a controlled manner, such as by driving a plunger 45 through a wall of the sealant container 36. In another example, the sealant container may have a closure (not shown) that may be opened in a controlled manner when it is desired to release the liquid sealant 37 from the sealant container 36. The prime mover 34 or a separate prime mover may be configured to release the liquid sealant when so signaled by the controller 38. For example, the prime mover 34 may be mechanically coupled to a closure for selectively opening the sealant container 37 or to a plunger 45 for puncturing the sealant container 37.

Another, optional safety and convenience feature of the safety system 30 is a timer 33 for controlling the state of the valve 20 according to an electronic schedule. The electronic schedule may be included with the control logic that is executed by the controller 38. The electronic schedule may be user-configurable, allowing a user to input one or more scheduling parameters via the user interface 31. For example, the safety system 30 may be configured to automatically close the valve 20 late at night, or during other user-programmable or factory-programmable time periods when the hydrocarbon gas-fueled device 16 is unlikely to be used. This function may include an override feature allowing a user to override any default scheduling, if the user desires to use the hydrocarbon gas-fueled device 16 during scheduled downtime.

Alternatively, the prime mover 34 may close the valve 20 by default to reduce the likelihood of hydrocarbon gas from escaping from the hydrocarbon gas delivery system 10. The timer 33 may be operated by a user to provide a finite time period during which the default closed-valve condition may be overridden. For example, if the hydrocarbon gas-fueled device 16 is a grill, the user may set the timer 33 for a desired time period, such as two hours, during which the safety system 30 may allow the valve to remain in the opened stated. After expiration of the predefined time interval, the prime mover 34, under the control of the controller 38, may automatically power the valve 20 to the closed state.

Figure 2:
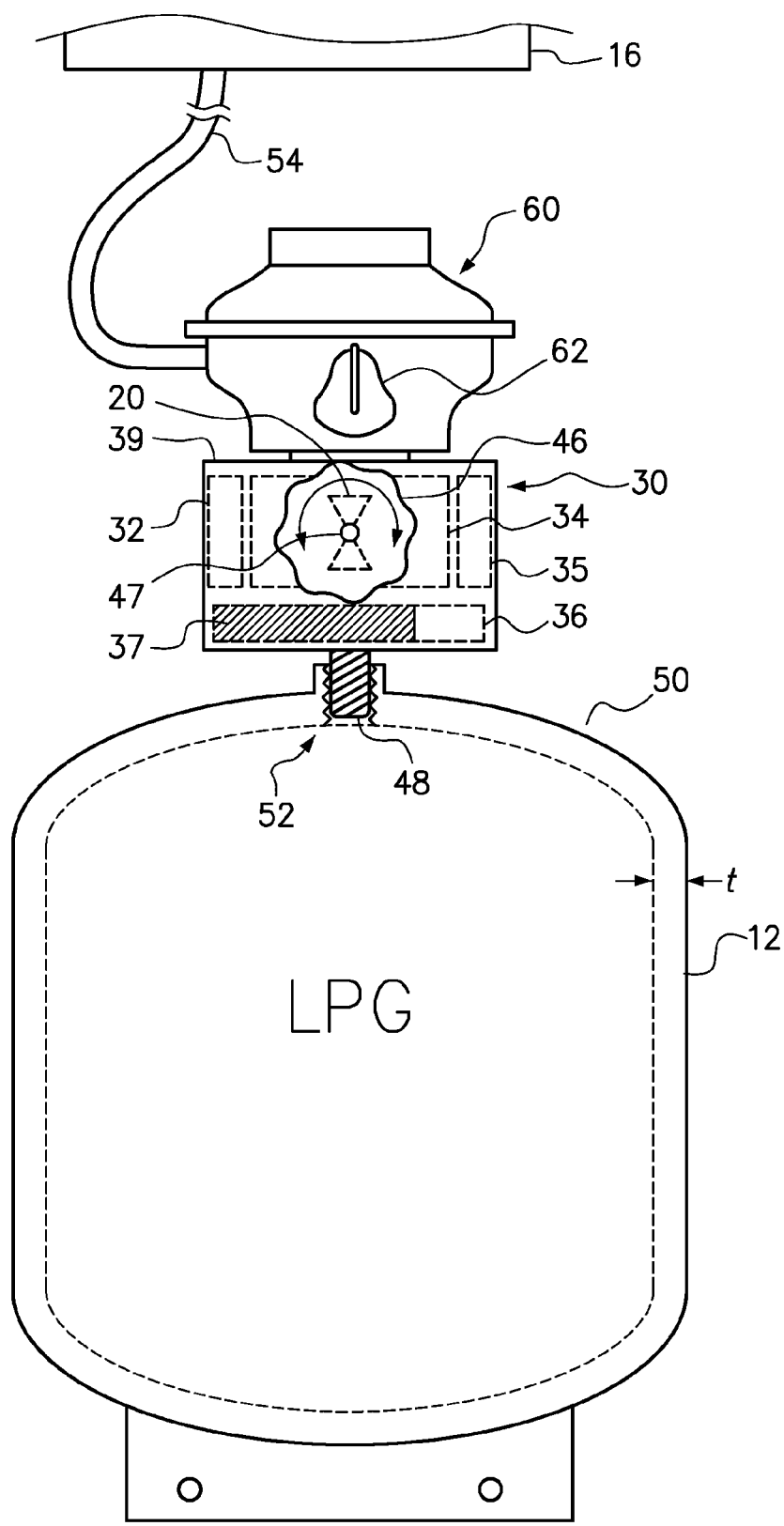
FIG. 2 is an elevation view of the hydrocarbon gas delivery system according to a specific example embodiment.

FIG. 2 is an elevation view of the hydrocarbon gas delivery system 10 according to a specific example embodiment. In this embodiment, the tank 12 is made of metal or other material having sufficient strength to withstand the internal pressure of LPG in the tank 12. The tank 12 has a wall 50 having a wall thickness "t." A port 52 through the wall 50 is threaded. The rigid adapter body 39 includes a threaded pressure fitting 48 that threadedly mates with the threaded port 52, to provide a sealed interface between the adapter body 39 and the tank 12. More specifically, the sealed interface may be between a valve 20 contained within the adapter body 39 and the tank 12, as hydrocarbon gas from the tank flows through the pressure fitting 48 to the valve 20 and typically not through the portion of the adapter body 39 external to the valve 20. The threaded pressure fitting 48 and threaded port 52 may be manufactured, for example, according to a National Pipe Thread (NPT) standard.

The rigid adapter body 39 houses the LPG sensor 32, the prime mover 34, the energy source 35, the sealant container 36, and the sealant 37 in the sealed sealant container. The prime mover 34 is embodied as an electric motor. The energy source 35 is embodied as an electric battery 35 electrically coupled to the motor 34 and to the LPG sensor 32. The valve 20 is included within the adapter body 39 in this embodiment, and includes an externally-accessible knob 46. The knob 46 may be rotated by hand in one direction (e.g. counterclockwise) to open the valve 20, and in an opposite (e.g. clockwise) direction to close the valve 20. The motor 34 may also power the valve 20 to the open or closed state. For example, the motor 34 and the knob 46 may be mechanically coupled to a common shaft 47 as part of a mechanical actuator used to open and close the valve 20.

A conventional pressure regulator 60 is optionally provided along the flow path from the tank 12 to the hydrocarbon gas-fueled device 16. The pressure regulator 60 is secured to the adapter body 39 and is sealingly coupled to the valve 20 downstream of the valve 20. The pressure regulator may be mechanically coupled to the adapter body 39 using any of a variety of mechanical fasteners known in the art. The pressure regulator 60 may be sealingly coupled to the valve 20 using, for example, a threaded connection (not shown). A polymeric hose 54, which may be a component of the supply line 18 (see FIG. 1), is used to couple the pressure regulator 60 to the hydrocarbon gased device 16, as shown. The pressure regulator 60 includes its own flow control mechanism, which may include another valve, for independently controlling the flow of hydrocarbon gas through the pressure regulator 60. During normal operation, a user may control the flow of hydrocarbon gas from the tank 12 to the hydrocarbon gas-fueled device 16 using the pressure regulator. For example, the user may use the pressure regulator 60 to open the flow of hydrocarbon gas, or to regulate the rate of flow of hydrocarbon gas, such as to adjust the intensity of a cooking flame at the hydrocarbon gas-fueled device 16. The user may use the pressure regulator 60 to completely shut off the flow of hydrocarbon gas from the tank 12 to the hydrocarbon gas-fueled device 16 when the hydrocarbon gas-fueled device 16 is not in use. The valve 20 in the safety system 30 may then be separately controlled, as described above, to attempt to close the valve 20 in response to a signal from the LPG sensor 32.

Figure 3:
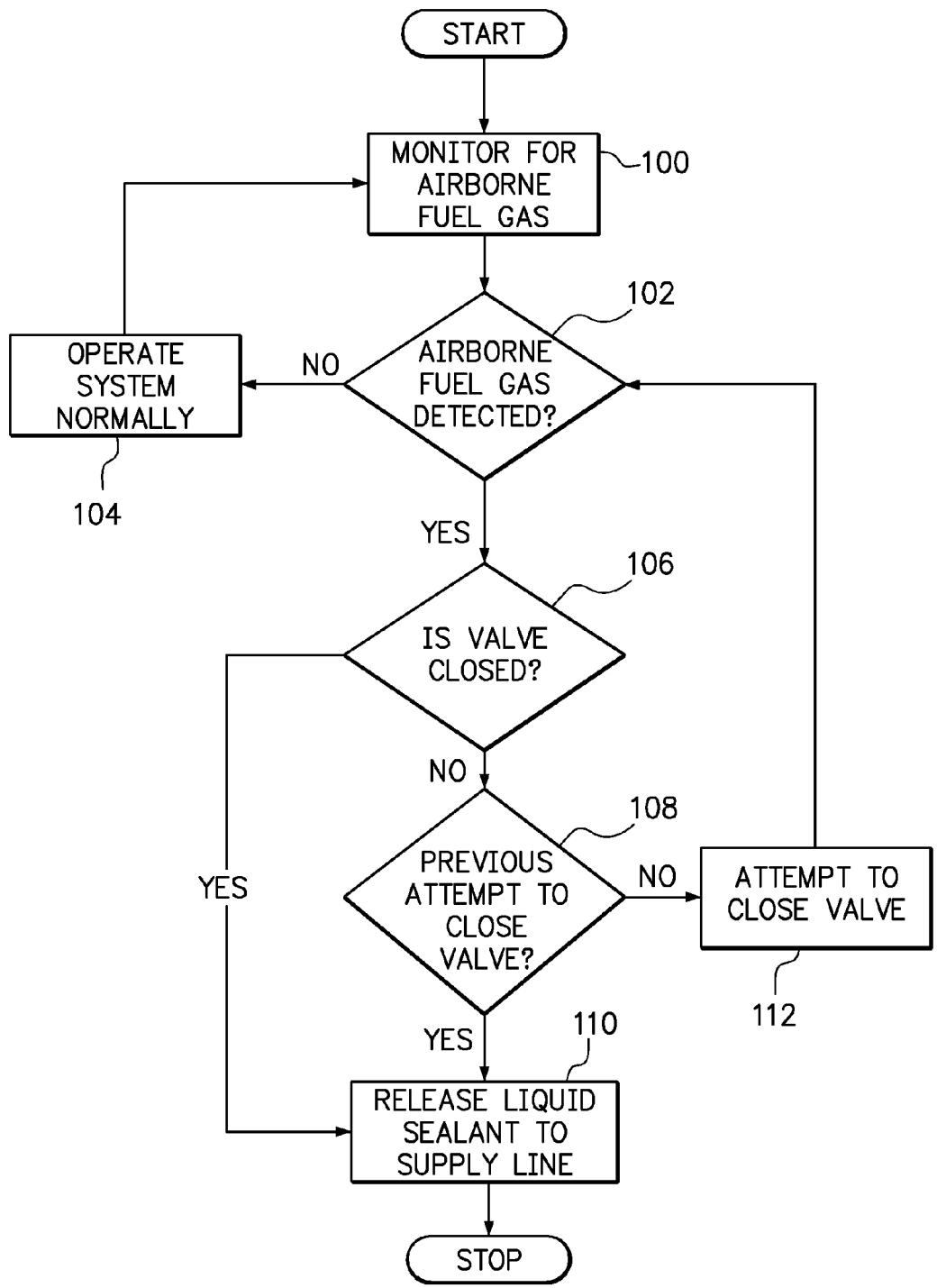
FIG. 3 is a flowchart of a method of controllably delivering hydrocarbon gas, such as to a hydrocarbon gas-fueled device, according to an embodiment of the invention.

FIG. 3 is a flowchart of a method of controllably delivering hydrocarbon gas, such as to a hydrocarbon gas-fueled device, according to an embodiment of the invention. The flowchart may relate, for example, to the operation of the hydrocarbon gas delivery systems of FIGS. 1 and 2, or more generally to other hydrocarbon gas delivery systems. Therefore, the method steps are described in the context of a hydrocarbon gas delivery system including an LPG tank and a hydrocarbon gas-fueled device to be supplied with hydrocarbon gas from the LPG tank.

Step 100 involves monitoring for airborne LPG in the vicinity of the hydrocarbon gas delivery system. For example, the airborne LPG may be caused by LPG leaking from the hydrocarbon gas delivery system or from non-combusted LPG entering the air due to an extinguished pilot flame of a hydrocarbon gas-fueled device. An electronic LPG sensor may be used to detect any airborne LPG. The sensor generates a signal in response to the detection of airborne LPG. The sensor generates a signal that at least generally indicates whether airborne LPG is or is not detected. The signal generated by the sensor may, more specifically, indicate a level of LPG detected, such as may be expressed as a concentration of LPG in the air.

Conditional step 102 involves a determination of whether airborne LPG is present, as determined by the LPG sensor. This determination may be a simple determination of whether airborne LPG is, or is not, detected. This determination may alternatively involve a quantitative determination using one or more threshold value. For example, a sensed level of airborne LPG may be compared against a predetermined threshold level of LPG. A sensed level of airborne LPG that is less than the threshold value may generate a "NO" value, indicating that an appreciable level of airborne LPG is not detected. The hydrocarbon gas delivery system may continue to be operated normally according to step 104 if an appreciable level of airborne LPG is not detected. Conversely, a sensed level of airborne LPG that equals or exceeds the threshold value may generate a "YES" value at conditional step 102, indicating that an appreciable level of airborne LPG has been detected.

Detecting an appreciable level of airborne LPG in conditional step 102 (resulting in a "YES" value) leads to conditional step 106, which determines whether the valve used to control the flow of hydrocarbon gas from the tank is closed. If the valve is closed, the presence of airborne hydrocarbon gas in an appreciable amount indicates a leak. The valve may be assumed to be closed, for example, if a mechanical actuator used to close the valve is known to be in a fully closed position. Thus, if the valve is already closed at conditional step 106, then liquid sealant is released to a supply line of the hydrocarbon gas delivery system according to step 110. The liquid sealant, once released, is intended to close the flow of hydrocarbon gas and/or seal a leak in the hydrocarbon gas delivery system. The released liquid sealant hardens at some point after it has been released.

If the valve is not yet closed at conditional step 106, then conditional step 108 determines whether an attempt to close the valve has previously been performed. For example, a prime mover may have attempted to close the valve, but a stuck valve actuator or a faulty coupling between the prime move and the valve actuator may have prevented the full closure of the valve. Thus, if the valve is not closed according to conditional step 106, but a previous (unsuccessful) attempt was made to close the valve according to conditional step 108, then liquid sealant is released according to step 110 (described above). Alternatively, if the valve is not closed according to conditional step 106, but no previous attempt was made to close the valve according to conditional step 108, then an attempt is then made to close the valve according to step 112. After attempting to close the valve in step 112, the method may return to conditional step 102 of determining whether an appreciable amount of airborne hydrocarbon gas is detected.

Different threshold values for the detected level of airborne hydrocarbon gas may be used to trigger different corrective actions. For example, a first threshold value may be used for triggering the closure of the valve, and a second threshold value may be used for subsequently triggering the release of liquid sealant. In some cases, the first threshold may equal the second threshold. However, in other circumstances it is desirable for the second threshold to have a value of less than the first threshold. For example, if airborne hydrocarbon gas continues to be detected after closing (or at least attempting to close) the valve, this indicates a possible leak in the hydrocarbon gas delivery system. Thus, the second threshold, used for triggering the release of liquid sealant, may be smaller in value than the first threshold, used for triggering closure of the valve. Although not required, any of the threshold values may be set below a critical value (e.g. a particular airborne concentration) at which hydrocarbon gas is known to combust or explode. For example, the critical value may be the lower limit of a flammable range, which is the range of concentration of a gas or vapor that will burn (or explode) if an ignition source is introduced.

The threshold(s) may include one or more additional parameters in addition to a concentration. For example, each threshold may include both a concentration threshold and a corresponding time threshold, whereby a corrective action is taken only if a concentration threshold is continuously sensed for the full duration of a time threshold.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for controllably delivering hydrocarbon gas to a hydrocarbon gas-fueled device, the system comprising:
    a pressure vessel for containing a pressurized hydrocarbon gas;
    a valve selectively movable between an open state and a closed state for controlling the flow of the hydrocarbon gas from the pressure vessel to a supply line in fluid communication with the pressure vessel;
    a liquid sealant in a sealant container, the liquid sealant configured for hardening if released from the sealant container;
    a hydrocarbon gas sensor for detecting airborne hydrocarbon gas and generating a signal in response; and
    a controller in communication with the hydrocarbon gas sensor and the valve, the controller including a prime mover configured for automatically moving the valve to the closed state in response to the signal from the hydrocarbon gas sensor if the valve is in the open state and for releasing the liquid sealant to the supply line in response to the signal from the hydrocarbon gas sensor if the valve is in the closed state.

2. The hydrocarbon gas delivery system of claim 1, wherein the valve comprises a mechanical valve actuator configured for manually moving the valve between the open and closed states by hand, and wherein the prime mover is removably coupled to the mechanical valve actuator.

3. The hydrocarbon gas delivery system of claim 2, wherein the mechanical valve actuator comprises a knob rotatable in a first direction for moving the valve to the open state and in a second direction for moving the valve to the closed state.

4. The hydrocarbon gas delivery system of claim 1, further comprising:
    a rigid adapter body holding the prime mover, the sensor, the sealant container and sealant, wherein the adapter body is configured for removably securing to the valve with the prime mover operably coupled to the mechanical valve actuator.

5. The hydrocarbon gas delivery system of claim 1, wherein the signal generated by the sensor includes a detected level of hydrocarbon gas, and wherein the controller is configured to automatically move the valve to the closed state in response to the level reaching a first threshold while the valve is in the open state and to release the liquid sealant to the supply line in response to the level reaching a second threshold.

6. The hydrocarbon gas delivery system of claim 5, wherein the second threshold is less than the first threshold.

7. The hydrocarbon gas delivery system of claim 5, wherein each threshold includes a concentration threshold and a corresponding time threshold, whereby a corrective action is taken only if the concentration threshold is continuously sensed for the full duration of the corresponding time threshold.

8. The hydrocarbon gas delivery system of claim 4, further comprising:
    an electronic user interface on the rigid adapter body for communicating scheduling parameters from a user to the controller, wherein the controller configures a schedule for closing the valve according to the scheduling parameters.

9. The hydrocarbon gas delivery system of claim 1, wherein the controller further comprises:
    a timer, wherein the controller is configured for closing the valve according to a preprogrammed schedule.

10. The hydrocarbon gas delivery system of claim 9, wherein the preprogrammed schedule is user-configurable.

11. The hydrocarbon gas delivery system of claim 9, wherein the prime mover biases the valve to a default closed-valve state, and the timer is configured to provide a finite time period during which the default closed-valve state may be overridden, after which the prime mover automatically powers the valve back to the default closed-valve state.

12. The hydrocarbon gas delivery system of claim 1, wherein the liquid sealant is pressurized within the sealant container under sufficient pressure to move the liquid sealant into the supply line in response to releasing the liquid sealant from the sealant container.

13. The hydrocarbon gas delivery system of claim 12, wherein the controller is configured for puncturing the sealant container to release the sealant to the supply line.

* * * * *

UNITED STATES PATENT AND TRADEMARK OFFICE
CERTIFICATE OF CORRECTION

PATENT NO. : 8,439,072 B2  
APPLICATION NO. : 12/910045  
DATED : May 14, 2013  
INVENTOR(S) : Pankaj S. Bavishi Page 1 of 1

It is certified that error appears in the above-identified patent and that said Letters Patent is hereby corrected as shown below:

Title Page

Item (75) inventor, "Pankaj A. Bavishi, III" should read -- Pankaj S. Bavishi --.

Signed and Sealed this  
Twenty-fifth Day of June, 2013

Teresa Stanek Rea  
*Acting Director of the United States Patent and Trademark Office*